3,370,022
EXPANDABLE POLYMERS
Alvin R. Ingram, Murrysville, and Alvin J. Zupanc, Irwin, Pa., assignors to Koppers Company, Inc., a corporation of Delaware
No Drawing. Filed Dec. 3, 1965, Ser. No. 511,319
6 Claims. (Cl. 260—2.5)

This invention relates generally to expandable thermoplastic material and more particularly improved expandable styrene polymer particles which exhibit a strong anti-lumping property during preexpansion.

Expandable particles or beads of thermoplastic material generally contain a blowing agent which will boil below the softening point of the thermoplastic material and which will cause the particles to expand under the influence of heat. Conventionally, the particles are heated by injecting steam or other suitable heat media under pressure into the mold cavity to heat the particles above their softening point whereupon the particles expand to fill the mold cavity and fuse together. The particles can be either placed directly into the mold or they can preexpand before being placed in the mold as, for example, is described in United States Patent No. 3,023,175.

While thermoplastic expandable polymer particles have worked well to form a wide variety of articles, they have had certain disadvantages. During the preexpansion process, the particles have a tendency to stick together and form lumps which renders the particles unsuitable for molding. Heretofore, to alleviate the lumping problem, a lubricant has been added to the surface of the particles prior to preexpansion such as, for example, silicone oil or magnesium stearate, but the amount of lubricant had to be carefully controlled. In fact, it has been found that satisfactory fusion of the particles on molding is not achieved when lubricants are added in slight excess of that needed. The use of a lubricant has other disadvantages, for example, silicone oil has the effect of reducing the shelf life of the particles due to a rapid loss of blowing agent and also impairs the free-flowing properties of the beads because of its oily nature. Solid lubricants such as magnesium stearate have the disadvantage of being difficult to distribute evenly on the beads.

Surprisingly, we have found that the expandable polymer particles can be made free from lumping during preexpansion by the addition of unsaturated polyesters to the polymerizing monomer or mixtures thereof at the proper stage of the polymerization. Excessive amounts do not impair free flowing of the beads, the shelf life or the fusion of the foam.

In accordance with this invention a vinyl aromatic monomer either alone or in admixture with other polymerizable monomer copolymerizable therewith is suspended in water with the aid of a suspending agent and polymerized in an aqueous suspension in the presence of a catalytic amount of a free radical initiator until about between 50 and 95 percent conversion of the vinyl monomer to polymer has occurred. Then, based upon the weight of monomer, there is added at least about 0.05 percent by weight of an unsaturated polyester and the polymerization is completed. The polymer particles are rendered expandable by incorporating therein a volatile organic blowing agent.

Polymerizing monomers in an aqueous suspension is a well-known operation. The monomer or mixture of monomers, to which has been added a free radical initiator, in the form of an oil phase is admixed with water and heated.

Typical free radical initiators are oil soluble free radical catalysts such as benzoyl peroxide, t-butyl perbenzoate, lauroyl peroxide, azo-bis-isobutyronitrile, etc.

The mixture is stirred or agitated so that the oil phase is in the form of small individual droplets.

The temperature for the polymerization, of course, must be high enough so that the polymerization occurs at a reasonable rate depending upon the catalyst system used with the preferred temperature range being between about 70 and 120° C.

After the polymerization has progressed to a certain point, which varies depending upon the nature of the monomer or monomers, the droplets tend to become sticky so that stirring alone is insufficient to keep the droplets from coalescing. It is therefore necessary to have suspending or stabilizing agent present in the polymerization mixture. Examples of suitable stabilizing agents are polyvinyl alcohol, hydroxyethyl cellulose, tricalcium phosphate, etc.

In accordance with this invention when the polymerization has reached a point between about 50 and 95 percent conversion of the vinyl monomer, at least 0.05 percent based upon the weight of monomer of an unsaturated polyester resin is added to the suspension. Quantities of polyester resin less than 0.05 have no appreciable effect in reducing the lumping tendency of the particles. On the other hand as a practical matter quantities of polyester resin of over 2.0 percent have generally been found to be unnecessary and wasteful. Generally, the earlier the polyester is added to the suspension of polymerizing monomer, the less polyester is needed to achieve the desired anti-lumping properties.

The time of addition of the polyester is critical and should be made between about 50 and 95 percent conversion. It has been found that addition of the polyester to the monomers prior to polymerization results in very unstable suspensions. Addition prior to about 50 percent conversion gives particles having very odd shapes. The product particles are disc-like when the addition is made from about 50 to 75 percent conversion with the shape becoming more spherical at the higher conversions. Addition of the polyester between about 75 and 95 percent conversion results in predominantly round beads. Addition after 95 percent conversion while not affecting the shape of the beads is wasteful since only a small portion of the polyester will react with the almost completely polymerized monomer and large amounts of polyester are needed in order to provide a satisfactory anti-lumping property. While, if it is desired to produce spherical granules, the addition should be made to correspond with between 75 and 95 percent conversion of the monomer, earlier addition of the polyester (i.e., between about 50 and 75 percent conversion) is not a disadvantage if particles of a somewhat flatter shape are desired since the particles give equally good results with regard to anti-lumping and molding properties and have the advantage of not being a hazard to operating personnel should they be spilled on the floor during subsequent operations.

The unsaturated polyesters react with the polymerizing monomer to cross link the surface of the polymer particles. This is evidenced by the formation of toluene insoluble material. The harder cross-linked surface has the effect of preventing individual particles from fusing together to form lumps or agglomerates during the early stages of preexpansion. However, after preexpansion has occurred, the surface is sufficiently enlarged so that the cross-linked portions are not sufficiently concentrated to have any deleterious affect upon the fusion properties when the particles are molded. Furthermore, due to the fact that the cross-linking polyesters are in themselves long chain ploymers cross-links which are provided are flexible rather than rigid so that expandability is not adversely affected. In fact the presence of the polyester increases the flexibility of the polymer foam when it is molded into thin walled articles, such as cups. The lips of the cups can be squeezed together without fracturing the cups.

The unsaturated polyesters useful in the practice of our invention are those prepared by condensing dihydroxy alcohols with unsaturated dibasic acids, for example, the polymerization products of glycols such as propylene glycol with unsaturated dibasic acid anhydrides such as maleic anhydride with or without saturated dibasic anhydrides such as phthalic anhydride. The polyesters can be further modified by monocarboxylic acids, monohydroxy alcohols and small amounts of polycarboxylic acids and polyhydroxy alcohols. The polyesters are employed in the form of a viscous liquid resin formulation prepared by mixing the resin with a vinyl monomer such as styrene or diallyl phthalate in amounts of about 25–40 percent by weight of monomer based on total weight of formulation. Such formulations are sold under the trademark Koplac (Koppers Company, Inc.).

In order to evenly disperse the unsaturated polyesters on the surface of the beads, it has been found advantageous to dissolve a small amount of a surface active agent in the polyester resin formulation prior to the time that it is added to the suspension. Suitable active surface agents include those normally used during the impregnation of the polymer particles with blowing agent, i.e., polyoxyethylene sorbitan monolaurate; amounts of about 0.1 or 0.2 percent of surface active agents have been found effective for this purpose based on monomer. Since the unsaturated polyester resin formulations are somewhat viscous it has also been found convenient to further dilute the resin formulation with styrene monomer which not only aids in the incorporation of the dispersing agent in the resin but also improves the distribution of the resin on the surface of the polymer particles. The amount of styrene employed is generally in a ratio of 1:4–1:1 by weight styrene to polyester resin formulation.

The blowing agent may be incorporated in the polymer particles at the desired time, for example, during polymerization or after the polymerization has been completed. Suitable blowing agents can be employed which boil below the softening point of the polymer, for example, aliphatic hydrocarbons such as pentane, isopentane, hexane, cyclohexane; halogenated aliphatic hydrocarbons such as ethyl chloride, propylchloride, isopropylbromide, isopropylchloride, dichlorodifluromethane, trichlorofluoromethane, 1,1,2-trichlorotrifluoroethane, etc. The blowing agents are employed in amounts of from 3–20 percent by weight based on the monomer charge.

Our invention is further illustrated by, but not limited to, the following examples in which parts are parts by weight unless otherwise indicated.

*Example I*

To a 5 gallon glass lined kettle equipped with a three-bladed impellor, there was charged consecutively 100 parts of styrene monomer, 0.45 part of a catalyst mixture comprising 0.30 part benzoyl peroxide and 0.15 part t-butyl perbenzoate, 102 parts distilled water and 0.10 part a buffer tetrasodium pyrophosphate. The mixture was stirred by the three-bladed impellor at a speed of 200 r.p.m., heated to 90° C. and maintained at that temperature and approximately 88 minutes after reaching 90° C., 0.175 part of suspending agent hydroxyethyl cellulose (Natrosol 250–G–R, Hercules Powder Co.) was added. After the mixture had been heated at 90° for a total of 4.75 hours, when it was determined by sample that approximately 75 percent of the monomer had been converted to polymer, there was added 1.0 part of Koplac 3700–50 (1:1 (mole basis) propylene glycol-maleic anhydride polyester in 28 percent by weight styrene) containing 0.2 part of the dispersing agent Tween 20 (polyoxyethylene sorbitan monolaurate). After the addition of the polyester, heating at 90° C. was continued for 1 hour and then 8.5 parts of the blowing agent n-pentane were added to the suspension over a 90 minute period. The temperature of the suspension was then raised to 115° C. which took 30 minutes and maintained at 115° C. for an additional 4 hours to complete the polymerization and impregnate the blowing agent into the particles. The polymerization slurry was dewatered and the beads rinsed with water after which the wet beads were dried in an air stream at room temperature for about 3 hours.

To determine the degree of cross linking, a 1 gram portion of the product beads was mixed with 100 milliliters of toluene at 25° C. The toluene was filtered through a tared sintered glass filter and the filter dried for 12 hours at 75° C. The filter was reweighted to determine the amount of polymer retained on the filter. The toluene insoluble portion was 0.3 percent by weight.

The product beads were then separated into two portions by size Portion A, through 10 and on 25 mesh U.S. Standard Sieve Series, and Portion B, throuh 25 and on 40 mesh U.S. Standard Sieve Series. The volatile content, density on preexpansion, and lumping on preexpansion were determined on each portion of the beads as follows: one gram samples of each portion were accurately weighed in an aluminum weighing dish on an analytical balance and then heated for 2 hours in an oven at 150° C. After the beads had been cooled to room temperature in a desiccator, the weighing dish and contents were reweighed on the balance. The weight loss was calculated and reported as the percent volatile content of the bead sample. Portion A had a volatile content of 6.26 percent by weight and Portion B had a volatile content of 5.62 percent by weight. An expandability and lumping test was conducted on each portion of the beads by placing 4 gram quantities of the portions separately into a cylindrical screen cage (4″ high x 3.5″ in diameter) along with two No. 2 rubber stopper tumblers. To preexpand the beads, the cage was rotated for 3 minutes at 60 r.p.m. in a closed container in a steam atmosphere at atmospheric pressure. The expanded beads were recovered from the screen cage and allowed to air dry in paper containers for approximately 18 hours. The aged, expanded beads were screened through a No. 3½″ mesh U.S. Standard Sieve and the percent lumping determined from the weight of the beads which were retained on the screen. Portion A beads had 2 percent lumps and Portion B beads had 11 percent lumps. The bulk density of the Portion A beads was 1.47 lbs./cu. ft. and the bulk density of the Portion B mesh beads was 1.69 lbs./cu. ft.

The −25+40 mesh beads (Portion B) were expanded to a density of 4.5 lbs./ft.$^3$ and then aged for 24 hours. The foam particles were placed in a cup-shaped mold cavity (⅛″ thickness x 2⅞″ diameter at the top and 2″ diameter at the bottom) surrounded by a steam jacket. Steam was injected into the mold cavity to cause the beads to expand and fuse together. The cup molded from the beads was well fused and of an attractive appearance and of such a flexibility that the lips of the cup were squeezed together 15 times without fracturing the cup. In contrast, a cup molded from a commercial product (Dylite F–40) fractured after 5 times when this is attempted.

Beads were prepared by the above procedure but without adding the polyester resin. The beads exhibited 40 and 75 percent by weight lumps in the −10 to +25 mesh and −25+40 mesh portions respectively.

*Example II*

To a 2-liter resin kettle equipped with a three-bladed impellor there was added 100 parts of the monomer styrene, 0.45 part of a catalyst comprising 0.30 part benzoyl peroxide, 0.15 part t-butyl perbenzoate, 100 parts of water and 0.1 part of the buffer, tetrasodium pyrophosphate. The mixture was agitated at 200 r.p.m. and heated to 90–92° C. After about 80 minutes at 92° C., 0.2 part of the suspending agent, hydroxyethyl cellulose, was added and the stirring and heating at 90–92° C. was continued for an additional 4 hours and 40 minutes after which the slurry was cooled at 23° C. To individual beverage bottles were added 160 grams of the reaction slurry, 40 milliliters of water, $x$ grams of the polyester resin listed in Table I containing 0.1 $x$ grams of polyoxyethylene sorbitan monolaurate dissolved therein, additional (0.16 gram–0.1 $x$ grams) polyoxyethylene sorbitan monolaurate (where $x$ is the amount in grams of the polyester resin needed to give the percent by weight of polyester resin based on styrene monomer which is shown in Table I) and 11.5 milliliters of the blowing agent, n-pentane. The bottles were then capped and agitated end-over-end in an oil bath at 115° C. for four hours to complete the polymerization and to impregnate the blowing agent into the beads. The beads were separated from the water, rinsed with water and air dried. The volatile content and density and lumping on preexpansion were determined as in Example I with the results shown in Table I below.

TABLE I

| Experiment | Polyester Resin | Percent by Weight on Styrene | Volatiles, Percent by Weight | Density, lbs./ft.³, 3 Minutes in Steam | Lumps, Percent by Weight |
| --- | --- | --- | --- | --- | --- |
| II-1 | None | | 6.87 | 0.97 | 46 |
| II-2 | Koplac 3700-50 [a] | 0.05 | 7.15 | 0.92 | 43 |
| II-3 | ----do---- | 0.10 | 7.15 | 0.97 | 43 |
| II-4 | ----do---- | 0.25 | 6.93 | 0.96 | 21 |
| II-5 | ----do---- | 0.50 | 6.94 | 0.97 | 10 |
| II-6 | Koplac 2000-25 [b] | 0.25 | 7.04 | 0.97 | 33 |
| II-7 | ----do---- | 0.50 | 6.87 | 1.01 | 21 |
| II-8 | Koplac 1010-5 [c] | 0.50 | 6.82 | 0.98 | 28 |
| II-9 | ----do---- | 1.00 | 6.88 | 1.01 | 23 |

[a] 1:1 (mole basis) propylene glycol-maleic anhydride in 28% by weight styrene.
[b] 1:0.5:0.5 (mole basis) propylene glycol-phthalic anhydride-maleic anhydride in 30% styrene.
[c] 1:0.67:0.33 (mole basis) propylene glycol-phthalic anhydride-maleic anhydride in 38% styrene.

The results, Table I, show the more reactive polyester resins (those containing the higher percentage of maleic anhydride) gives a greater affect on the lumping tendency of the beads since less of these resins is required to give improved lumping properties.

*Example III*

To demonstrate the importance of the time of the addition of the unsaturated polyester resin, a series of experiments was conducted. In each case, to a 5 gallon glass lined kettle there was charged consecutively 100 parts of the monomer styrene, 0.45 part of a catalyst comprising 0.3 part benzoyl peroxide, 0.15 part t-butyl perbenzoate, 102 parts distilled water and 0.10 part of the buffer, tetrasodium pyrophosphate. The mixture was stirred by a three-bladed impellor at a speed of 200 r.p.m. and heated to 90° C. After 80 minutes at 90° C., 0.175 part of the suspending agent hydroxyethyl cellulose was added. Heating was continued at 90° C. and the 0.5 part of Koplac 3700-50 polyester resin containing dissolved therein 0.2 part of the dispersing agent polyoxyethylene sorbitan monolaurate was added to the suspension at the time shown in Table II. After the mixture had been heated a total of six hours at 90° C., there was added 11.5 parts of the blowing agent n-pentane and the temperature was raised to 115° C. for four hours to complete polymerization and impregnate the blowing agent into the particles. In the case of Experiment III-7 the blowing agent addition was made after the polyester had been added. The percent by weight toluene insolubles, expansion and lumping tests were conducted as in Example I and the bead size and shape was determined by screening and observation. The results are shown in Table II.

It can be seen from the results shown in Table II that the addition of the polyester to the monomer resulted in failure of the suspension. Addition prior to the bead identity point resulted in the preparation of particles ranging in shape from very irregular particles when the addition is made at 1.4 hours (39 percent conversion) to flat discs when the addition was made at 2.5 and 3.0 hours (50 and 62 percent conversion) and thick discs at 3.75 hours (72 percent conversion). Addition at the bead identity point or at 4.5 hours (about 81 percent conversion) resulted in round beads having good expansion and lumping characteristics. Addition after 6 hours where the beads were hard (98 percent conversion) as evidenced by the increased lumping tendency and the decreased amount of toluene insoluble material produced less effective cross linking of the bead surface by the polyester due to a lower amount of styrene monomer being available for reaction. It can be seen that the toluene insoluble materials (i.e., the amount of cross-linked material) decreases the later the polyester is added to the system.

The portions of the beads prepared in Examples III–III, III–IV and III–V, which had been preexpanded for the lumping tests, were placed in individual 5 x 5 x ⅜ inch molds and the molds placed between the platens of a conduction press where the beads were heated to expand them and cause them to fuse together. The bead-to-bead fusion in each case was excellent.

*Example IV*

To illustrate the improvement achieved in the dispersion of the polyester resin on the surface of the bead by diluting the resin formulation with additional amounts of styrene and to show the optimum amount of dispersing agent to be added with the resin a series of experiments was conducted using the following procedure. To two-liter resin kettles there was added 750 grams of the monomer, styrene, containing as catalysts 0.35 percent benzoyl peroxide and 0.15 percent t-butyl perbenzoate, 750 milliliters of water and 0.75 gram of the buffer tetrasodium pyrophosphate. The kettles were heated to 90° C. and after 82 minutes 1.3 grams of the suspending agent hydroxyethyl cellulose was added. At four hours 1.5 grams of Koplac 3700-50 polyester resin formulation containing the amounts of polyoxyethylene sorbitan monolaurate (Tween 20) and additional styrene shown in Table III was added to the suspension and the heating at 90° C. continued for an additional two hours to give a total heat-

TABLE II

| Experiment | Time of addition at 90° C. (hrs.) | Appearance of Suspended Phase | Toluene Insolubles, Percent by Weight | Predominant Bead Size and Shape [1] | Expansion in Steam 3 minutes | |
| --- | --- | --- | --- | --- | --- | --- |
| | | | | | Density, lbs./ft.³ | Lumps, Percent by Weight |
| III-1 | [2] | | | Suspension failed | | |
| III-2 | 1.4 | Liquid | 2.5 | Irregular particles | 1.00 | 2 |
| III-3 | 2.5 | Viscous | 1.2 | −10+20 mesh flat | .94 | 1 |
| III-4 | 3.0 | Tacky viscous | .8 | ----do---- | 0.94 | Nil |
| III-5 | 3.75 | Highly viscous | .2 | −16+20 mesh flat | 0.97 | Nil |
| III-6 | 4.5 | Soft beads | .12 | −16+20 mesh round | 0.94 | Nil |
| III-7 | 6.0 | Hard beads | .08 | −20+24 mesh round | 0.96 | 3 |

[1] U.S. Standard Sieve Series.   [2] To monomer.

ing time at 90° C. of six hours. The suspension was then cooled to 23° C. and two 200 gram portions of the slurry were placed in individual beverage bottles. To one bottle was added 12.5 milliliters of the blowing agent n-pentane, without additional dispersing agent (Experiments IV–1 to IV–6). To the other bottle was added 12.5 milliliters of the blowing agent n-pentane and 0.1 gram of polyoxyethylene sorbitan monolaurate (Experiments IV–1A to IV–6A). The bottles were capped and heated in an oil bath at 115° C. with end-over-end agitation for four hours, after which the bottles were cooled, the product beads dewatered, rinsed with water and dried in a stream of air at room temperature for two hours. The expandable bead properties were determined as in Example I along with the approximate external cell size of the preexpanded beads. The results are shown in Table III below. It has been found empirically that beads that lump less than 11 percent in the laboratory, usually lump less than 1 percent in the Rodman preexpander (U.S. Patent No. 3,023,175). In this case 0.2 percent Koplac 3700–50 polyester resin diluted with 0.1 percent styrene monomer eliminates lumps from the beads if the amount of dispersing agent in the polyester resin is at least 0.1 percent with or without additional dispersing agent being added just before the impregnation with blowing agent. Too little dispersing agent, .025–.05 percent, with the resin does not distribute the resin well enough while excess dispersing agent may remove some of the resin from the bead surface and cause it to be emulsified in the aqueous phase although apparently the additional dispersing agent does favorably lower the external cell size giving a better appearance to the foam. Although some beneficial effect on lumping can be noted by the dilution with increasing amounts of styrene, its major advantage is to facilitate the incorporation of dispersing agent in the resin formulation by reducing the viscosity of the formulation.

dried in an air stream for about 3 hours at room temperature. The beads had a volatile content of 5.42 percent by weight, 1 percent by weight lumps, and a bulk density of 1.60 lbs./cu. ft. as determined by the test procedures described in Example I.

*Example VI*

To a 2500 gallon reactor there was charged consecutively 100 parts of the monomer styrene, 0.45 part of the catalyst comprising 0.30 part benzoyl peroxide, 0.15 part t-butyl perbenzoate, 102 parts of water and 0.10 part of the buffer tetrasodium pyrophosphate. The mixture was stirred by a three-bladed impellor at a speed of 65 r.p.m., heated to 92° C. and maintained at that temperature. Approximately 80 minutes after reaching 92° C. 0.175 part of the suspending agent hydroxyethyl cellulose was added and the impellor speed was increased to 80 r.p.m. Approximately 10 minutes after the hydroxyethyl cellulose addition was completed there was added 0.2 part of ethylene-bis-stearamide as a paste contained in styrene (prepared by stirring up 0.4 part of amide with 1.5 parts of styrene). After an additional 150 minutes at 92° C. there was added 0.4 part of Koplac 3700–50 polyester resin formulation, containing 0.07 part of the dispersing agent polyoxyethylene sorbitan monolaurate (Tween 20) and an additional 0.1 part of styrene monomer. Heating was continued for an additional 120 minutes and then there was added 8.5 parts of the blowing agent n-pentane which took 30 minutes. The polymerization was then completed and the beads impregnated with the blowing agent by raising the temperature to 115° for 4 hours. Thereafter, the mixture was cooled to room temperature and the particles removed, washed with water and air dried. Portions of the beads were tested for expandability and lumping according to the procedure described in Example I. The beads had a bulk density of 1.00 lb./cu. ft.

TABLE III

| Experiment | Added with .2% by Weight Koplac 3700-50 | | Extra Tween 20, Percent by Weight at Impregnation | Expandable Bead Characteristics | | | |
|---|---|---|---|---|---|---|---|
| | Styrene, Percent by Weight | Tween 20,[1] Percent by Weight | | Volatiles, Percent by Weight | Density, lbs./ft.³, Minutes in Steam | External Cell Size, Mils | Lumps, Percent by Weight |
| IV-1 | 0.05 | 0.10 | ---------- | 5.90 | 1.22 | 3–4 | 7 |
| IV-1A | 0.05 | 0.10 | 0.10 | 5.90 | 1.24 | 2 | 10 |
| IV-2 | 0.10 | 0.10 | ---------- | 5.91 | 1.29 | 2–4 | 4 |
| IV-2A | 0.10 | 0.10 | 0.10 | 5.85 | 1.26 | 2 | 10 |
| IV-3 | 0.20 | 0.10 | ---------- | 5.99 | 1.26 | 2–4 | 4 |
| IV-3A | 0.20 | 0.10 | 0.10 | 5.88 | 1.26 | 2 | 10 |
| IV-4 | 0.10 | 0.075 | ---------- | 6.00 | 1.22 | 4 | 5 |
| IV-4A | 0.10 | 0.075 | 0.125 | 5.96 | 1.24 | 2 | 25 |
| IV-5 | 0.10 | 0.050 | ---------- | 5.95 | 1.33 | 4 | 11 |
| IV-5A | 0.10 | 0.050 | 0.15 | 5.90 | 1.26 | 2 | 30 |
| IV-6 | 0.10 | 0.025 | ---------- | 6.06 | 1.31 | 4 | 21 |
| IV-6A | 0.10 | 0.025 | 0.175 | 5.90 | 1.24 | 2 | 38 |

[1] Polyoxyethylene sorbitan monolaurate.

*Example V*

To a 100 gallon reactor there was added 100 parts of the monomer styrene containing 0.40 part of the catalyst consisting of 0.25 part benzoyl peroxide and 0.15 part t-butyl perbenzoate along with 73 parts of water, 0.364 part of the suspending agent system comprising 0.363 part tricalcium phosphate and 0.001 part Nacconol NRSF (dodecyl benzene sodium sulfonate). The slurry was stirred and heated to 90° C. at an agitator speed of 95 r.p.m. After 7 hours at 90° C. there was then added to the suspension 0.25 part Koplac 3700–50 polyester resin (1:1 propylene glycol-maleic anhydride in 28% by weight styrene monomer) containing 0.10 part of the dispersant, Atlas G 2127 (polyoxyethylene laurate). Heating was continued for 0.5 hour at 90° C. after which there was added as additional dispersants, .15 part tricalcium phosphate and .01 part Nacconol NRSF and 8.5 parts n-pentane which took 0.5 hour. The slurry temperature was then raised to 115° C. and heating continued for 4 hours at 115° C. to complete the polymerization and to impregnate the blowing agent into the beads. The bead slurry was dewatered, rinsed with water, and the wet beads and the percent lumping was nil. Portions of the preexpanded beads were then placed in a 20 x 20 x 12 inch mold cavity which was surrounded by a steam chest. Steam was injected into the mold for 30 seconds to cause the beads to expand and fuse together. The bead-to-bead fusion in the resulting foam blocks was good and the time required to cool the foam to a non-shrinking self-sustaining structure was 7 minutes.

*Example VII*

To a two-liter resin kettle there was added 100 parts of the monomer styrene containing 0.45 part of the catalyst comprising 0.3 part benzoyl peroxide and 0.15 part t-butyl perbenzoate, 102 parts of water, 0.10 part of the buffer, tetrasodium pyrophosphate, 2 percent based on styrene of the self-extinguishing agent, tris-(2,3-bromopropyl) phosphate, and 0.35 percent by weight based on styrene of a peroxide synergist, 2,5-t-butyl peroxy-2,5-dimethyl hexane. The mixture was stirred by a three-bladed impellor at a speed of 200 r.p.m., heated to 92° C. and maintained at that temperature. Approximately 80 minutes after reaching 92° C., 0.10 part of the suspending agent, hydroxyethyl cellulose, was added. After an additional 152 minutes at 92° C., there was added 0.5 part of Koplac 3700-50 polyester resin containing 0.1 part of the dispersing agent, polyoxyethylene sorbitan monolaurate, and heating was continued for an additional 60 minutes. A 160 gram portion of the slurry which had been cooled at 23° C. was placed in a beverage bottle along with 0.1 gram of polyoxyethylene sorbitan monolaurate and 10.5 milliliters of a blowing agent which was a 50:50 by volume mixture of isopentane and n-pentane. The bottle was capped and rotated end-over-end in an oil bath heated to 115° C. for 240 minutes after which the bottle was cooled and the beads separated from the aqueous phase by a centrifuge and washed with water and air dried. The beads had a volatile content of 5.97 percent by weight, expanded to a bulk density of 0.99 lbs./cu. ft. and had 3 percent lumps after preexpansion. The preexpanded beads were permitted to age for 24 hours then were molded into a ½ x 5 x 5 inch block by placing the mold containing the beads between the platens of an electrically heated press. The foam block had a density of 0.99 lbs./cu. ft. and the fusion was excellent. The foam block was cut into 5 one inch strips and the strips conditioned overnight in a 50-60° oven to remove any residual blowing agent. The foam strips were suspended vertically in a draft-free hood and ignited by holding a ½ inch flame from a microburner in contact with the bottom of each strip for from 3-5 seconds. The average time to extinguishment of sustained burning after the flame was removed from the strips was determined. The average time to extinguishment of the 5 strips was 1.0 seconds. An average time to extinguishment of 1.0 second or less is considered to adequate for commercial acceptability.

While the foregoing examples utilize styrene monomer as the polymerizable vinyl aromatic monomer it is to be understood that other vinyl aromatic monomers can be employed in the process and product of the invention and the term thermoplastic polymers as used herein includes a variety of homopolymers and copolymers derived from vinyl aromatic monomers including styrene, divinylbenzene, isopropyl styrene, alpha-methyl styrene, nuclear dimethyl styrene, chlorostyrene, vinyl naphthalene, etc., as well as polymers prepared by the copolymerization of a vinyl aromatic monomer with monomers such as butadiene and acrylonitrile wherein the vinyl aromatic monomers present in at least 50 percent by weight.

The foregoing has described novel expandable polymers and their method of preparation whereby the problem of lumping on preexpansion has been solved without the heretofore encountered difficulties of other anti-lumping systems which harm the fusion properties of the beads to the point where it has not been possible to obtain commercially acceptable moldings.

We claim:
1. A method of preparing expandable thermoplastic polymer particles which will not lump upon pre-expansion comprising polymerizing a vinyl aromatic monomer, either alone or in admixture with other polymerizable monomers copolymerizable therewith, in an aqueous suspension in the presence of a catalytic amount of a free radical initiator and a suspending agent until between about 50 and 95 percent conversion of the vinyl monomer to polymer has occurred, then adding at least about 0.05 percent by weight of an unsaturated polyester resin based on the weight of said monomer, completing said polymerization, and rendering the polymer particles expandable by incorporating therein from 3-20 percent by weight of a blowing agent.

2. The method of claim 1 in which said unsaturated polyester resin is added between about 75 and 95 percent conversion of said monomer.

3. The method of claim 1 wherein a dispersing agent is mixed with said unsaturated polyester resin prior to the time that said resin is added to said suspension.

4. The method of claim 1 wherein said unsaturated polyester resin is the condensation product of propylene glycol with maleic or phthalic anhydride and mixtures thereof.

5. A method of preparing expandable styrene polymer particles which comprises polymerizing a vinyl aromatic monomer in an aqueous suspension in the presence of a catalytic amount of a free radical initiator until between 50 and 95 percent of said monomer has been converted to polymer, then adding at least 0.05 percent by weight of an unsaturated polyester resin based on the weight of said monomer, completing the polymerization of the monomer and rendering the polymer expandable by incorporating therein from 3-20 percent by weight of a blowing agent.

6. An expendable styrene polymer particle made by polymerizing a vinyl aromatic monomer in an aqueous suspension in the presence of a catalytic amount of a free radical initiator until between 50 and 95 percent of the monomer has been converted to a polymer, then adding at least about 0.05 percent by weight of an unsaturated polyester based on the weight of said monomer, completing said polymerization and incorporating in the polymer from 3-20 percent by weight of a blowing agent thereby producing polymer particles which will not lump upon preexpansion.

References Cited

UNITED STATES PATENTS 2,865,800  12/1958  Stastny _____ 260—2.5

MURRAY TILLMAN, *Primary Examiner.*

MORTON FOELAK, *Assistant Examiner.*